(12) United States Patent
Nowack et al.

(10) Patent No.: US 7,458,608 B2
(45) Date of Patent: Dec. 2, 2008

(54) VEHICLE ROLLOVER PROTECTION SYSTEM WITH A ROLL BAR, WHOSE TOP PIECE IS ROUNDED IN U-SHAPE

(75) Inventors: Reinhard Nowack, Drolshagen (DE); Stephan Röhner, Dortmund (DE); Michael Nass, Bergneustadt (DE)

(73) Assignee: Ise Innovative Systems Europe GmbH, Bergneustadt (DE)

(*) Notice: Subject to any disclaimer, the term of this patent is extended or adjusted under 35 U.S.C. 154(b) by 0 days.

(21) Appl. No.: 11/338,977

(22) Filed: Jan. 25, 2006

(65) Prior Publication Data
US 2006/0170203 A1 Aug. 3, 2006

(30) Foreign Application Priority Data
Feb. 2, 2005 (DE) .................. 10 2005 004 646

(51) Int. Cl.
*B60R 21/013* (2006.01)
(52) U.S. Cl. .............. 280/756; 296/187.13; 296/190.03
(58) Field of Classification Search ................ 280/756; 296/187.13, 190.03
See application file for complete search history.

(56) References Cited

U.S. PATENT DOCUMENTS

| 5,094,478 A | * | 3/1992 | Pfanzeder et al. | ........... 280/756 |
|---|---|---|---|---|
| 5,626,361 A | * | 5/1997 | Heiner | ........................ 280/756 |
| 5,890,738 A | * | 4/1999 | Heiner et al. | ................ 280/756 |
| 6,179,327 B1 | * | 1/2001 | Muller et al. | ................ 280/756 |
| 6,386,585 B1 | * | 5/2002 | Muller et al. | ................ 280/756 |
| 6,805,378 B2 | * | 10/2004 | Berges et al. | ................ 280/756 |
| 6,902,190 B2 | * | 6/2005 | Nass | ........................ 280/756 |

FOREIGN PATENT DOCUMENTS

| DE | 43 42 400 | 2/1995 |
|---|---|---|
| DE | 298 07 322 | 12/1998 |
| DE | 100 13 376 | 6/2001 |
| DE | 202 15 276 | 2/2003 |
| DE | 203 03 691 | 8/2004 |
| DE | 103 49 693 | 3/2005 |
| EP | 0 788 932 | 8/1997 |
| EP | 0 904 991 | 3/1999 |

* cited by examiner

*Primary Examiner*—Paul N. Dickson
*Assistant Examiner*—Timothy Wilhelm
(74) *Attorney, Agent, or Firm*—Hudak, Shunk & Farine Co. LPA (57) ABSTRACT

Vehicle rollover protection system with a roll bar, whose top piece is rounded in a U-shape. Such top pieces are typically tubular and are made from pipe bending parts. In order to achieve a three-dimensional contour of the top piece with irregular cross section of its profile, the invention calls for at least the tubular top piece consisting of at least two axially divided partially tubular shells of sheet metal, joined to each other and having different geometrical shapes according to a nominal contour.

7 Claims, 11 Drawing Sheets

VEHICLE ROLLOVER PROTECTION SYSTEM WITH A ROLL BAR, WHOSE TOP PIECE IS ROUNDED IN U-SHAPE

FIELD OF THE INVENTION

The invention refers to a vehicle rollover protection system with a roll bar, whose top piece is tubular and rounded in a U-shape.

Such rollover protection systems serve to protect the passengers of motor vehicles without a protective roof, typically in convertibles or sports cars with a cover, since the vehicle will roll over on the roll bar.

BACKGROUND OF THE INVENTION

It is known how to provide a permanently installed roll bar spanning the entire width of the vehicle. In this solution, the increased air drag and the occurrence of driving noises is perceived as a drawback, apart from affecting the appearance of the vehicle.

It is also known how to coordinate a permanently installed, i.e., rigid U-shaped roll bar of unchangeable height with each vehicle seat. This solution is typically used in sports cars to underscore the sporty appearance.

Widely used in convertibles are structural solutions in which the U-shaped roll bar is retracted in the normal condition, and in case of danger, i.e., an imminent rollover, it is quickly extended into a protecting position, in order to prevent the passengers from being crushed by the vehicle rolling over.

These rollover protection systems typically have a U-shaped roll bar arranged in a guide body fixed to the vehicle, or a roll bar formed from a profile body, while the guide body is secured in a case housing. This roll bar or roll body in the normal state is held down in a position of rest by a holding device against the pre-stress force of an activating compression spring, and in event of a rollover a sensor releases the holding device and the force of the compression spring brings it into an upper protecting position, while a locking device which is then activated prevents the roll bar from being retracted or pushed in. Typically one case is assigned to each vehicle seat, especially for the rear seats. Alternatively, two cases can also be integrated in a rear wall structural unit.

One such case design for a roll bar system with a U-shaped roll bar is shown by DE 43 42 400 A 1.

The invention starts both from over-roll protection systems with rigidly installed roll bar and also those with deployable U-shaped roll bar, yet it also comprises systems in which only the top piece of the roll bar, formed from a profiled body, for example, is rounded in a U-shape.

U-shaped roll bars are today typically fabricated from simple pipe bending parts, with a rounded top piece and two parallel leg pieces. Such a U-shaped roll bar can be bent into a U-shape from a single piece of steel or aluminum tubing, or it can consist of a tubular and U-shaped top piece, to which the leg tubes are welded. In such a three-piece roll bar, the top piece can also be connected to the leg tubes by screwing, gluing, or a form-fitted connection (e.g., DE 202 15 276 U1). The U-shaped top piece can advantageously be made from a different material than the leg tubes.

U-shaped roll bars, and especially rigid roll bars, which are permanently arranged to be visible in the vehicle, are subject increasingly to safety engineering and also design-oriented requirements. The result is roll bars which, due to the necessary shape, and necessary length and cross section, are no longer fabricated as simple pipe bending parts. These requirements demand a three-dimensional bar contour with irregular cross section of the bar profile. As part of the safety engineering, there can be greatly rounded and flattened segments near the head of the vehicle passengers, so as to minimize the severity of an injury by the thickest possible foam padding.

SUMMARY OF THE INVENTION

The basic problem of the invention is to configure the above-indicated rollover protection system in regard to the roll bar, which is rounded into a U-shape at least in the top piece, so that it meets the above-mentioned requirements.

The solution of this problem occurs in a rollover protection system for motor vehicles with a roll bar, whose top piece is tubular and rounded into a U-shape, in that at least the tubular top piece consists of at least two axially separated, partially tubular shells of sheet metal, joined to each other and having different geometrical shape according to a nominal contour.

Thanks to the invented construction of tubular and U-shaped roll bars or correspondingly configured top pieces of roll bodies using partly tubular shells of sheet metal, it is possible to shape each individual shell individually with respect to the aforementioned requirements, using familiar hot and cold forming techniques.

A compound construction of the components of a rollover protection system is familiar in itself.

Thus, DE 100 13 376 C1 indicates a rollover protection system with a U-shaped roll bar, which can deploy and retract in a case firmly arranged on the vehicle, wherein the case is assembled from two sheet metal shells, each having two half shells to accommodate support tubes for the legs of the roll bar. In this case, the U-shaped roll bar is radially divided in the middle, in order to provide for an equalizing of tolerances when assembling and installing the roll bar. Therefore, this document gives no suggestion in the direction of the invention.

DE 203 03 691 U1 indicates a rollover protection device with a box like roll bar, which can deploy and retract in a case firmly arranged on the vehicle, wherein the roll bar is configured as a single or multiple-shell molded piece of fiber composite. In a two-shell layout, for example, two rectangular shells are fastened one on top of the other to form a profiled body. This shell construction has the sole purpose of increasing the stiffness and, thus, the resistance to buckling of the roll bar, and not to configure the shells individually in their outer contour in accordance with the required shape, course, and cross section of a roll bar.

The same also holds for the object of the earlier, not previously published patent DE 103 49 693 B3, whereby the shells of the rectangular box like roll bar, placed one on top of the other, can consist not only of fiber composite, but also of light metal or steel sheet.

DE 298 07 322 U1 indicates a shell-construction roll bar with a flat U-shaped configuration in its basic outline. In the basic configuration, the roll bar consists of a very wide, two-dimensional, rounded shell of fiber composite, or of sheet metal or other two-dimensional composite material, in which molded features are incorporated to give the shell the necessary strength. In one special configuration, a second two-dimensional shell is provided, overlapping the curvature of the first base shell and being welded to the base shell at the edge. This likewise has molded features to increase the strength of the roll bar.

This document gives no suggestion for a configuration of a tubular roll bar from partially tubular shells, whose individual deformability enables a different configuration satisfying the above-mentioned requirements.

Configurations and modifications of the invention are characterized in subsidiary claims and also appear from the description of the figures.

BRIEF DESCRIPTION OF THE DRAWINGS

The invention shall be explained more closely by means of sample embodiments represented in various views in the drawings.

These show.

DETAILED DESCRIPTION OF THE INVENTION

The drawings show in schematized representations a rollover protection system for motor vehicles with a tubular and U-shaped roll bar or top piece 1, which is assembled from two axially divided tubular shells 1a and 1b. These shells consist of a sheet metal material, being individually shaped to the nominal contour required by the vehicle manufacturer using familiar cold and hot forming techniques. Thanks to the shell construction of the roll bar or its top piece, i.e., the fact that the shells can be individually deformed before being put together, it is relatively easy and economical to create a three-dimensional trend of the bar contour with irregular cross section, i.e., individual shapes of the roll bar geometry.

The shells are firmly joined together by familiar techniques, e.g., by welding, gluing, riveting, clinching (double bending), soldering, or by a combination of these techniques. They can be surface coated in familiar fashion, and also padded with an appropriate plastic foam.

Thanks to the steps of the invention, a modular construction of the bar or top piece is finally possible, i.e., the shells are nested together so that the width, the depth and the height of the bar or the top piece can be individually adapted to the vehicle conditions.

Figure 1:
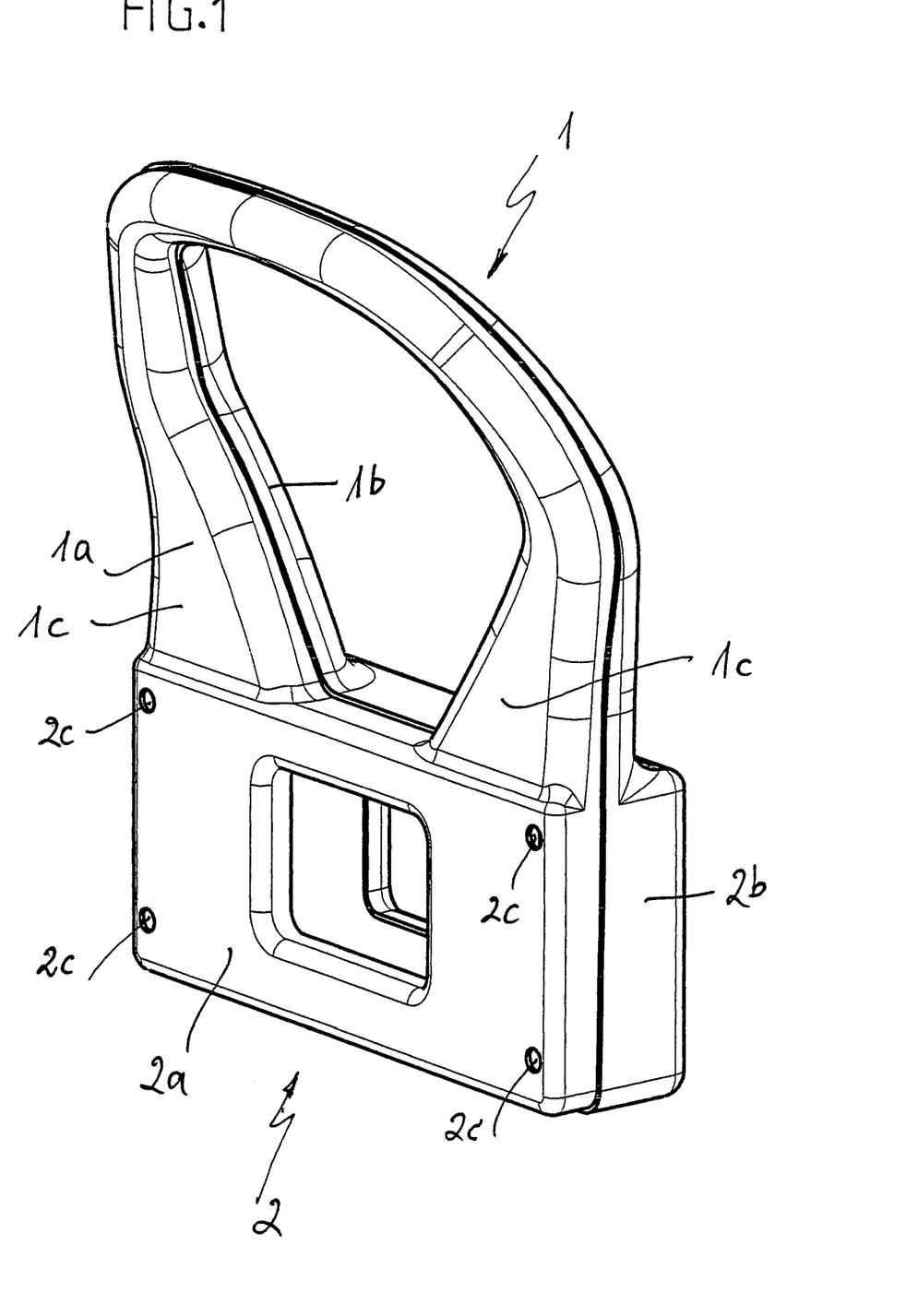
FIG. 1 in an isometrical view, a first embodiment of a two-shell, U-shaped roll bar with base piece, whose top piece shells are each formed onto the corresponding shells of the bottom piece as a single unit, FIG. 2 an exploded view of the roll bar of FIG. 1 to illustrate its shell construction, FIG. 3 a longitudinal cross section of the roll bar, corresponding to the drawing in FIG. 2, FIG. 4 a front view of the roll bar of FIG. 1, FIG. 5 a side view of the roll bar of FIG. 1 in cross section with foam padding and reinforcement or rubber/metal elements according to one version, FIG. 6 a magnified cutout per FIG. 1 with regard to the sectional area in the top piece, FIG. 7 in an isometrical view, a second embodiment of a two-shell, U-shaped roll bar with corresponding two-shell bottom piece, being rigidly fastened in the bottom piece (e.g., by welding), and whose three-dimensional contour exhibits an irregular cross section and special shapes, FIG. 8 a front view of the roll bar of FIG. 7, FIG. 9 a side view of a two-shell roll bar with foam padding and a partial section of the bottom piece, in which an elastically deformable absorber element is installed in another embodiment, FIG. 10 a side view with partial section of a two-shell, U-shaped top piece, which according to another embodiment is fastened to a deployable base body, FIG. 11 the top piece of FIG. 10 in front view, with bracket-like fastening shells formed onto it as a single piece (elongated top piece).

The bar or top piece 1 in the sample embodiment depicted in FIG. 1 is joined as a single piece by a respective broad transitional segment 1c to a base piece 2, which in turn serves to connect the bar to the body of the vehicle as a so-called rigid roll bar. This base piece is removably connected to the vehicle structure by the indicated fastening openings 2c, e.g., to the rear wall in the floor of a convertible. In the systems according to the prior art, on the other hand, the rigidly installed roll bars are provided with costly add-on parts needing to be installed.

Figure 2:
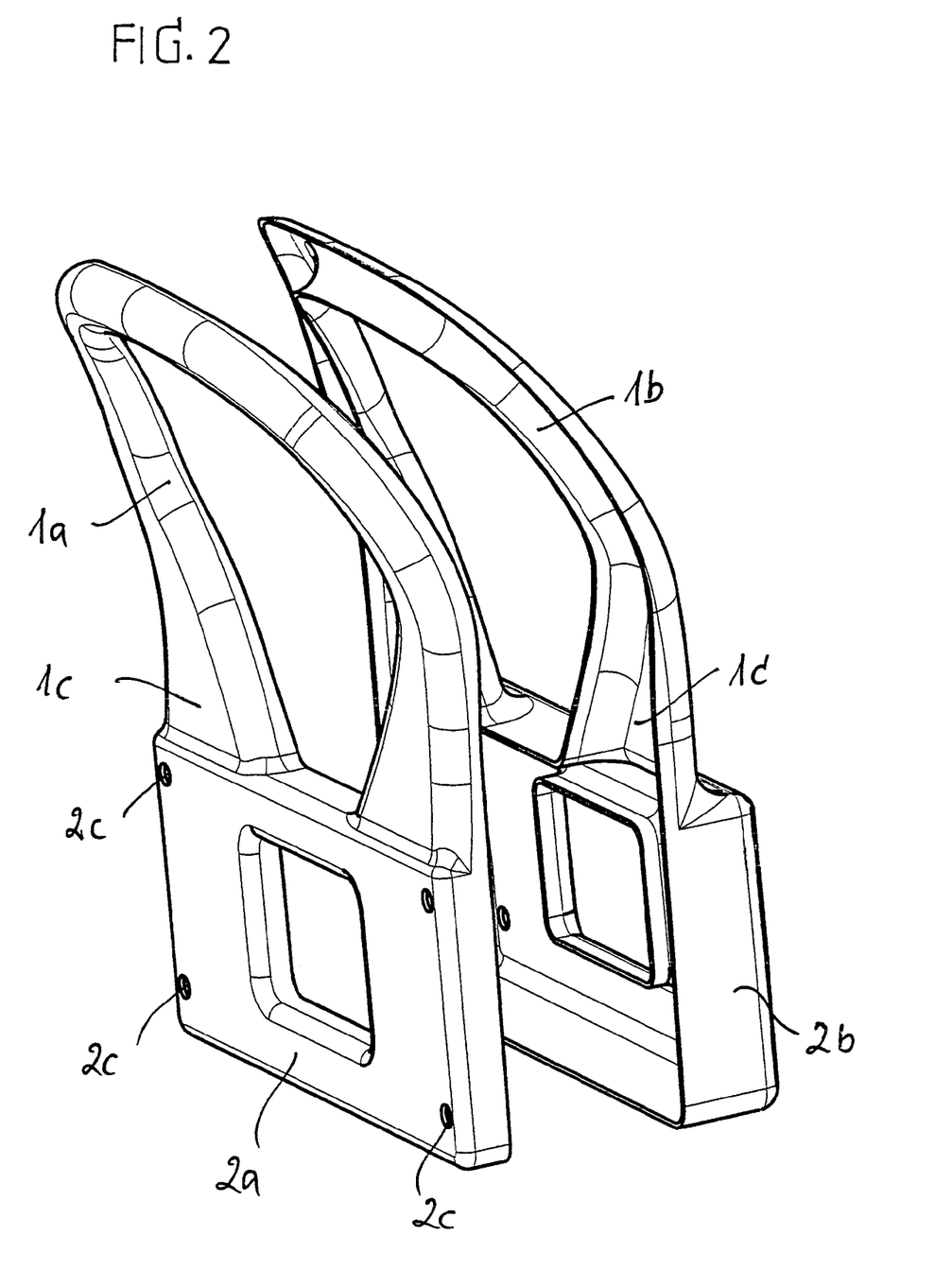
Figure 3:
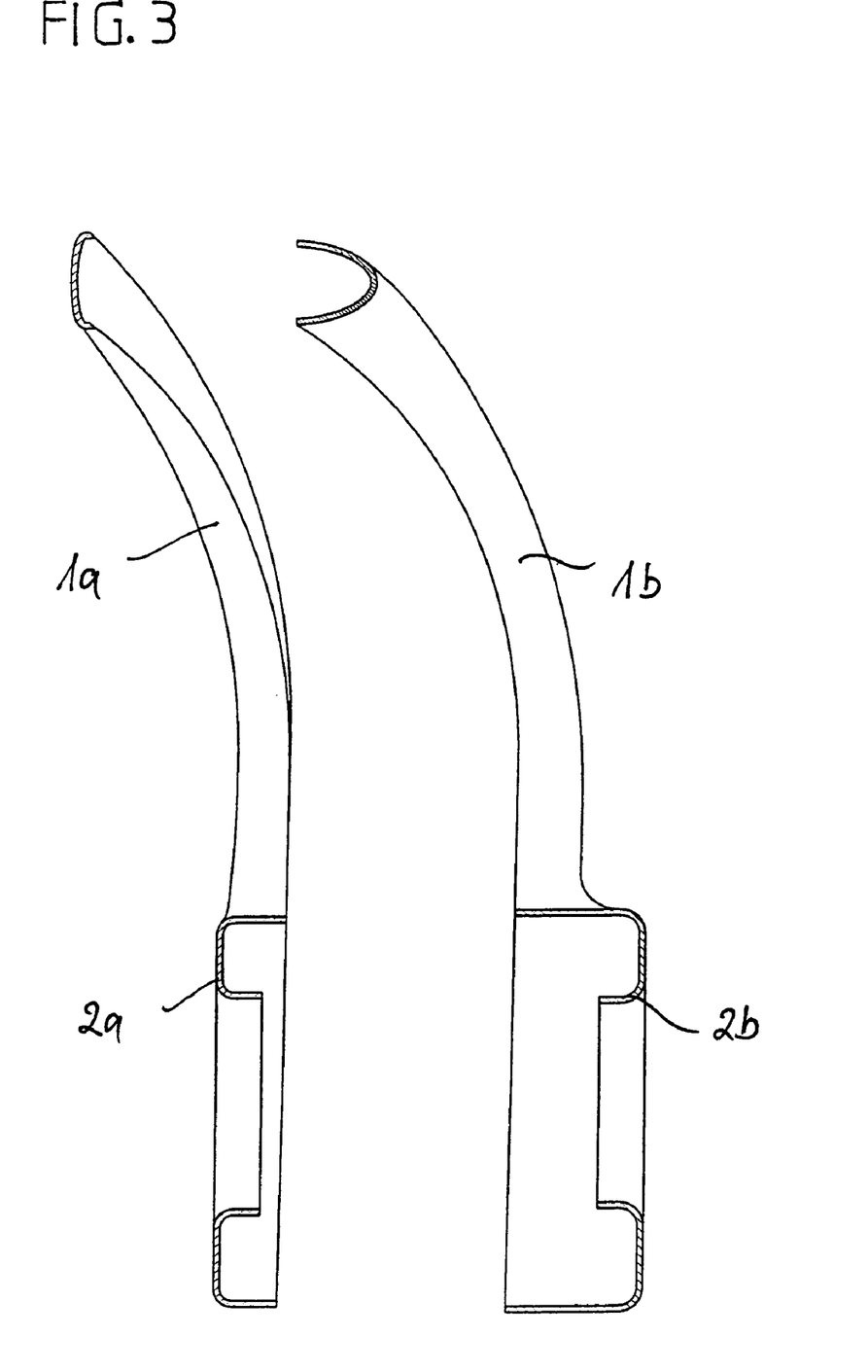
Figure 4:
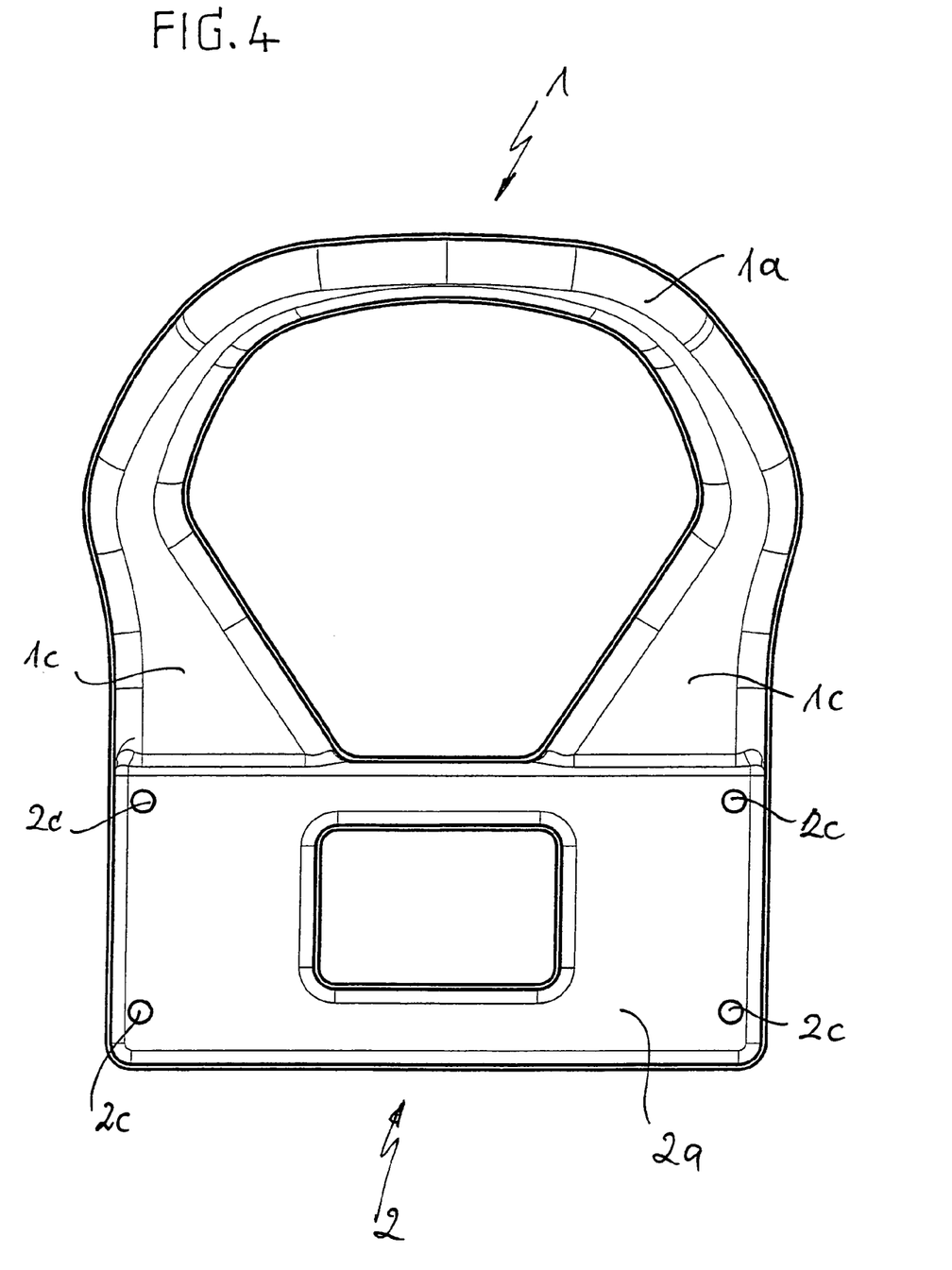

For an especially flexible configuration, according to one modification of the invention, and shown in particular by FIG. 2 as well, the base piece 2 similar to the roll bar or its top piece likewise consists of molded shells 2a, 2b of sheet metal, which are joined together in the plane of the bar, and the respective shells 2a and 2b of the base piece are formed onto the corresponding shells 1a and 1b of the roll bar or its top piece as a single element, i.e., they are deformed together with the top piece shells from a common sheet metal piece.

Figure 5:
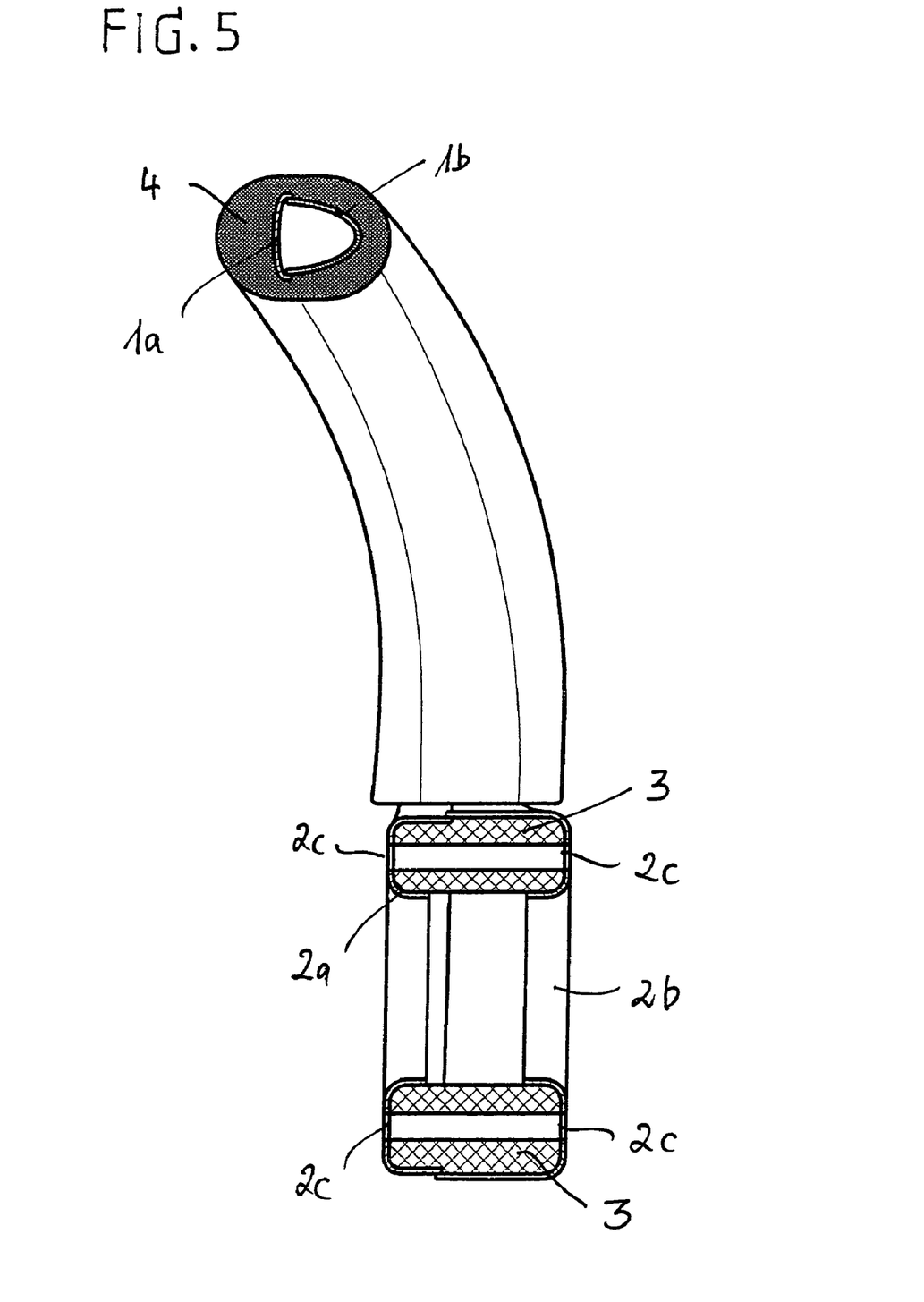

As FIG. 5 shows, spacers 3 are advisedly arranged inside the shells 2a, 2b of the base piece in the region of the fastening holes 2c, which prevent the shells 2a, 2b from being forced together under a load. Additional reinforcement parts such as struts can also be placed inside the shells or in the region of the transition from the legs of the bar to the base piece.

Figure 6:
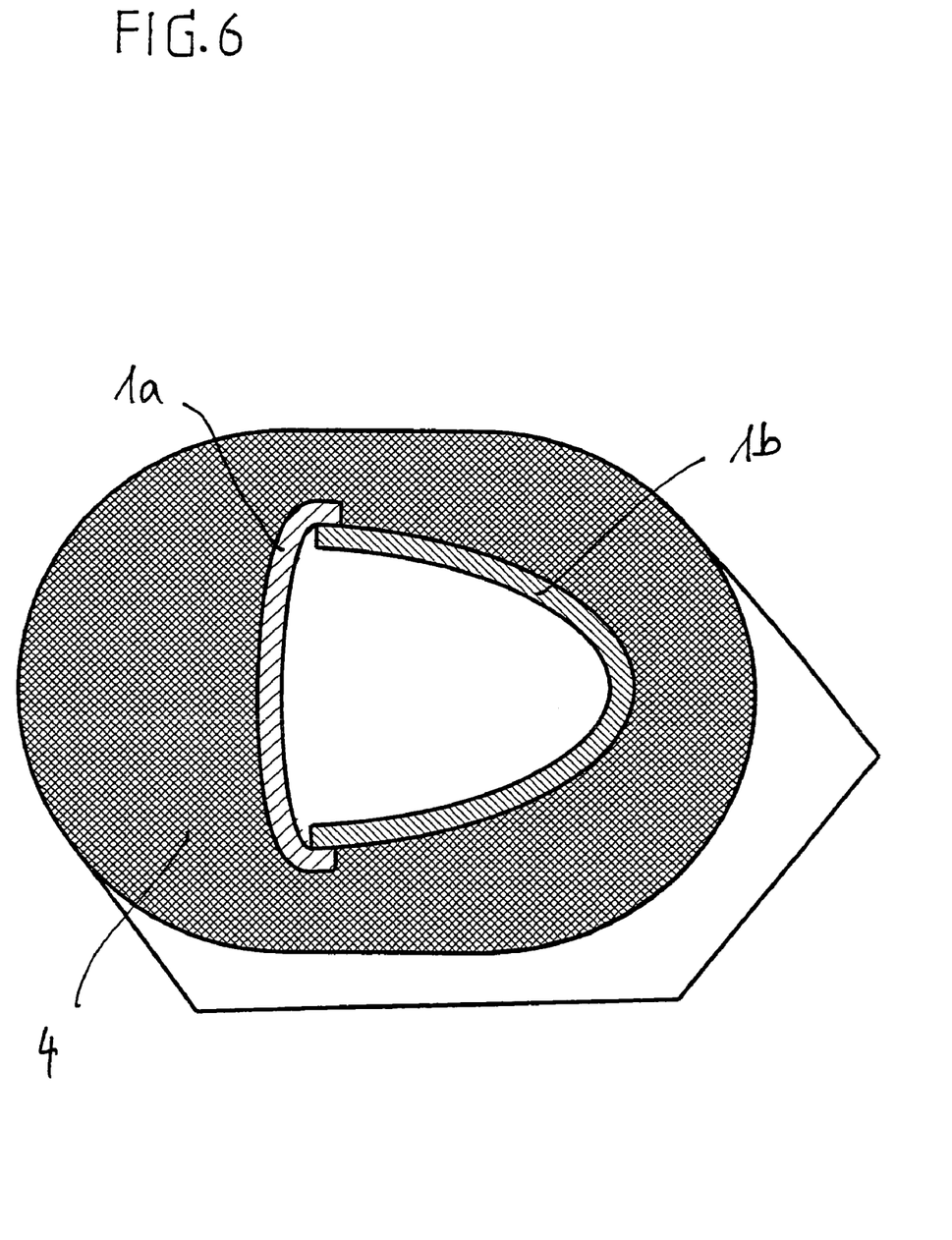

The sectional surface in the top piece of FIG. 5, in conjunction with the corresponding cutout enlargement of FIG. 6, shows a typical, yet merely exemplified, desirable geometrical difference between the two shells 1a, 1b, at top, with a foam padded part 4, namely, a flattened front shell 1a, facing the head of the passengers, and a rear shell 1b, with a parabolic cross section. The flattened shell makes it possible to provide a thicker foam padding in the front region, which reduces the severity of injury in a crash. The flattening can be partial or over the entire surface.

Figure 7:
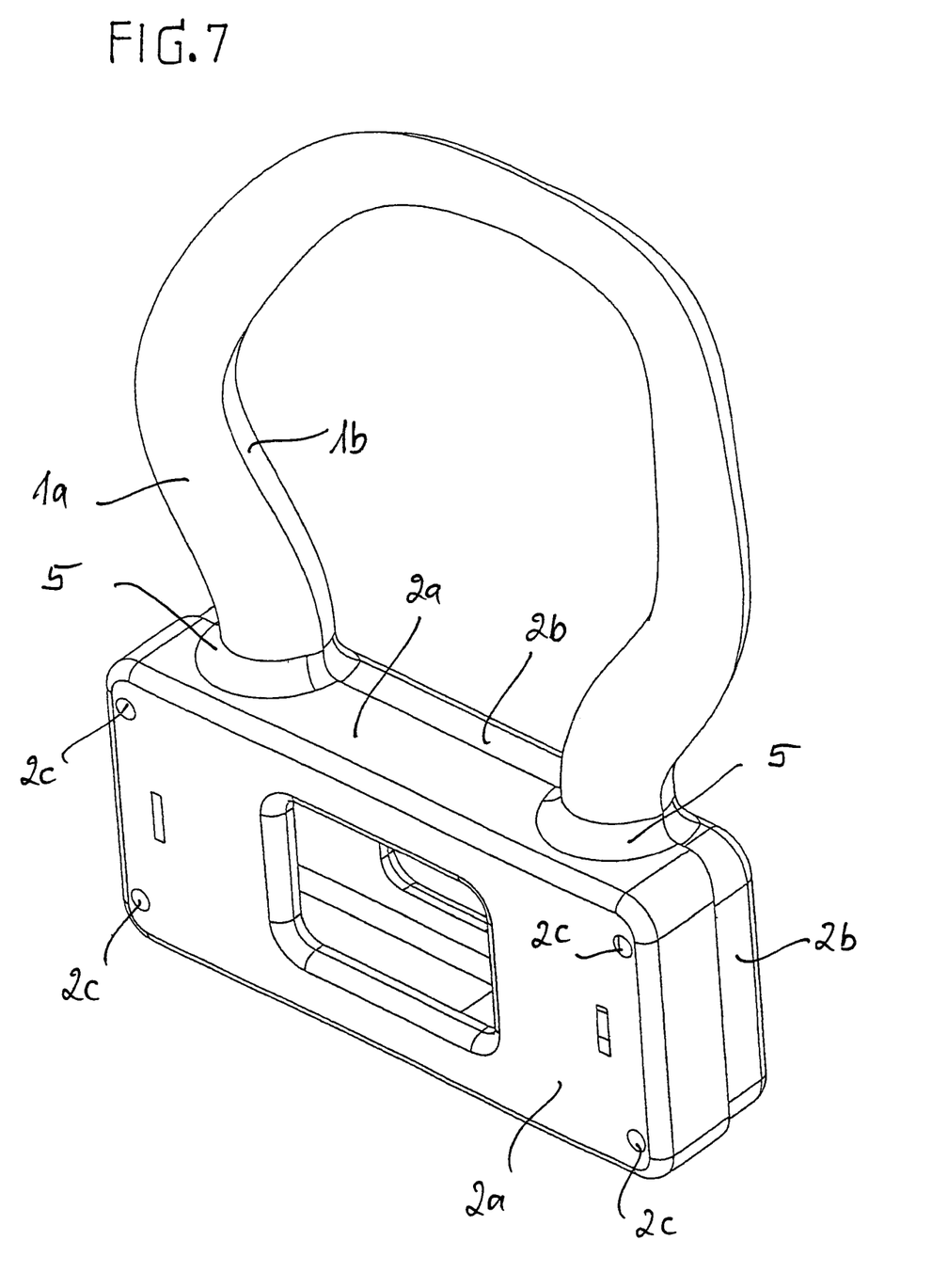
Figure 8:
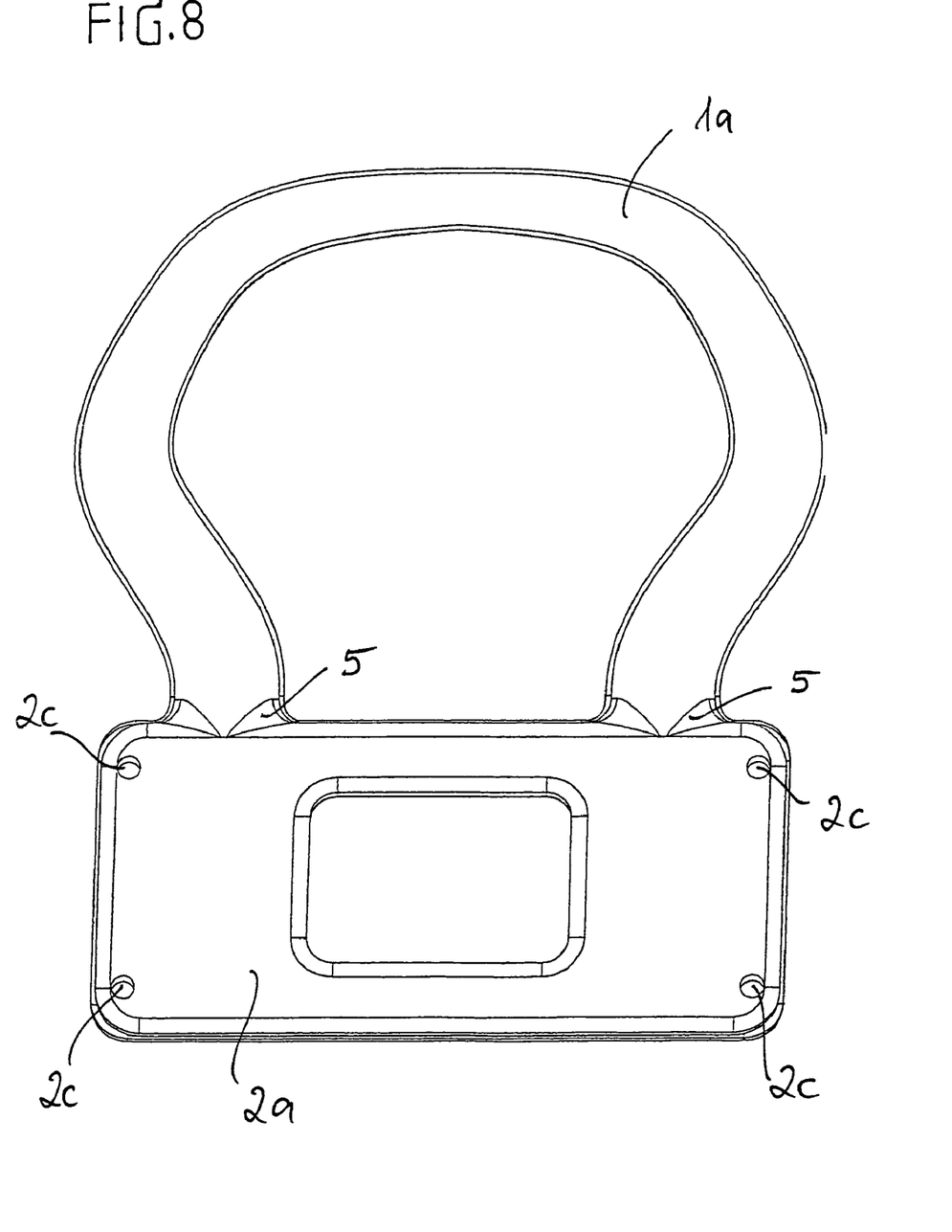

FIGS. 7 and 8 show another embodiment of the invention, in which, unlike the embodiment of FIG. 1, the bar shells 1a, 1b are formed separately from the base shells 2a, 2b and are joined to each other. The assembled roll bar 1 is then inserted into corresponding openings in the assembled bottom piece and secured therein, e.g., by welding, as is symbolically indicated by a weld 5 in FIGS. 7, 8.

Figure 9:
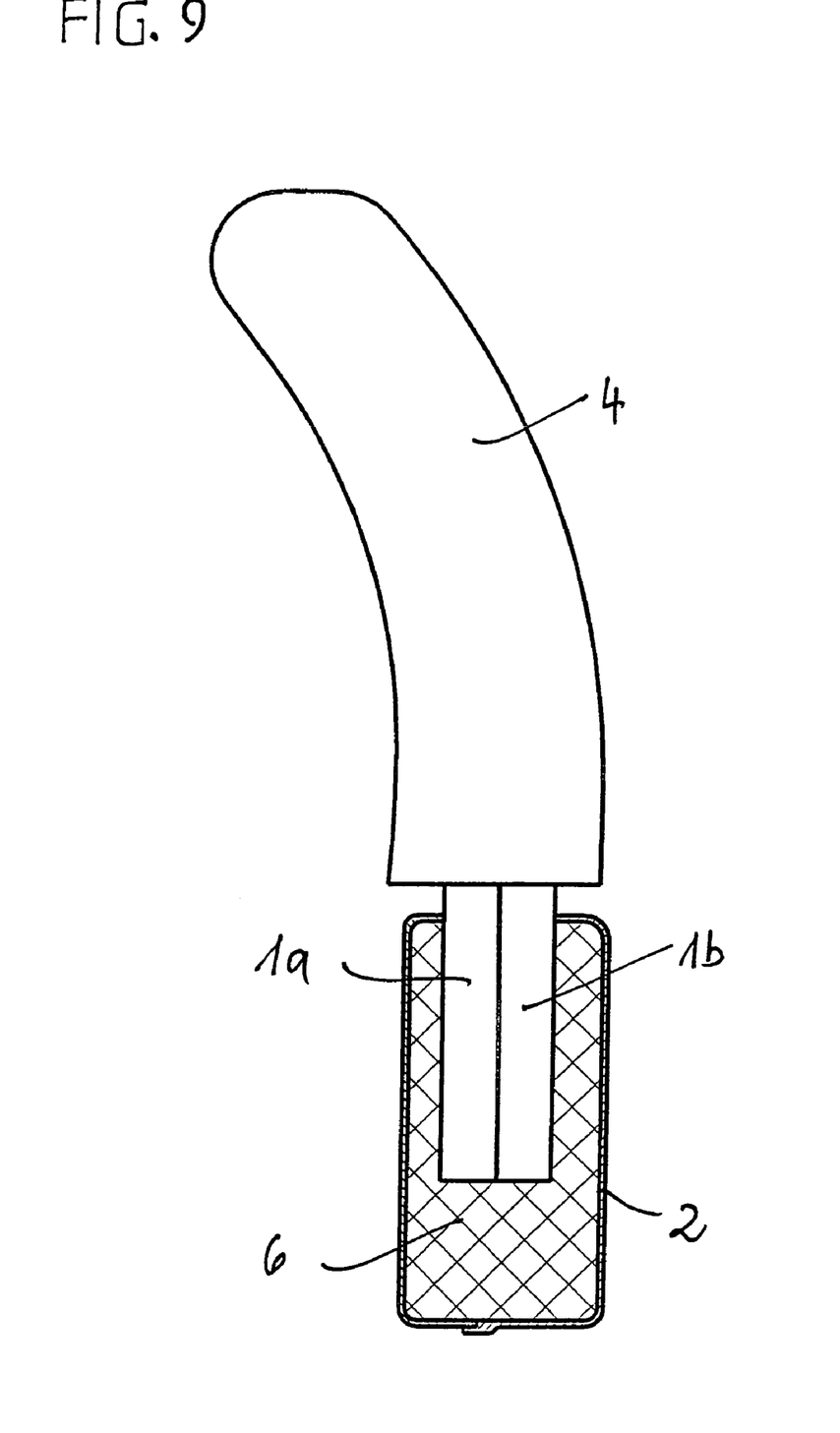

FIG. 9 shows, in another embodiment, a two-shell roll bar provided with foam padding 4, whose legs are introduced in conventional manner into the bottom piece 2 and secured there, while advisedly an elastically deformable absorber element 6 in the form of a rubber/metal connection is provided in the "transitional region" according to EP 0 788 932 B1, so that the roll bar can yield somewhat at the base when subjected to loading. As an alternative, the transitional region can also be configured per EP 0 904 991 B1.

Also conceivable, per FIG. 5, are rubber/metal elements which brace the shells against each other and which at the same time have boreholes for screwing to the car body. In the sample embodiment shown, there is a two-shell construction for the roll bar and the mounting part, i.e., the base piece. In theory, one can also have more than two shells.

Given a rollover protection system, with a roll bar configured as a whole in the shape of a U-shaped roll bar with top piece and two parallel legs, it is advisable to configure this so that not only the top piece, but also the legs consist of shells of sheet metal that are joined together, each of them being formed as a single piece onto the corresponding shells of the top piece. Versions with round and rectangular tubes in lengths of 100 to 500 mm are conceivable.

Figure 10:
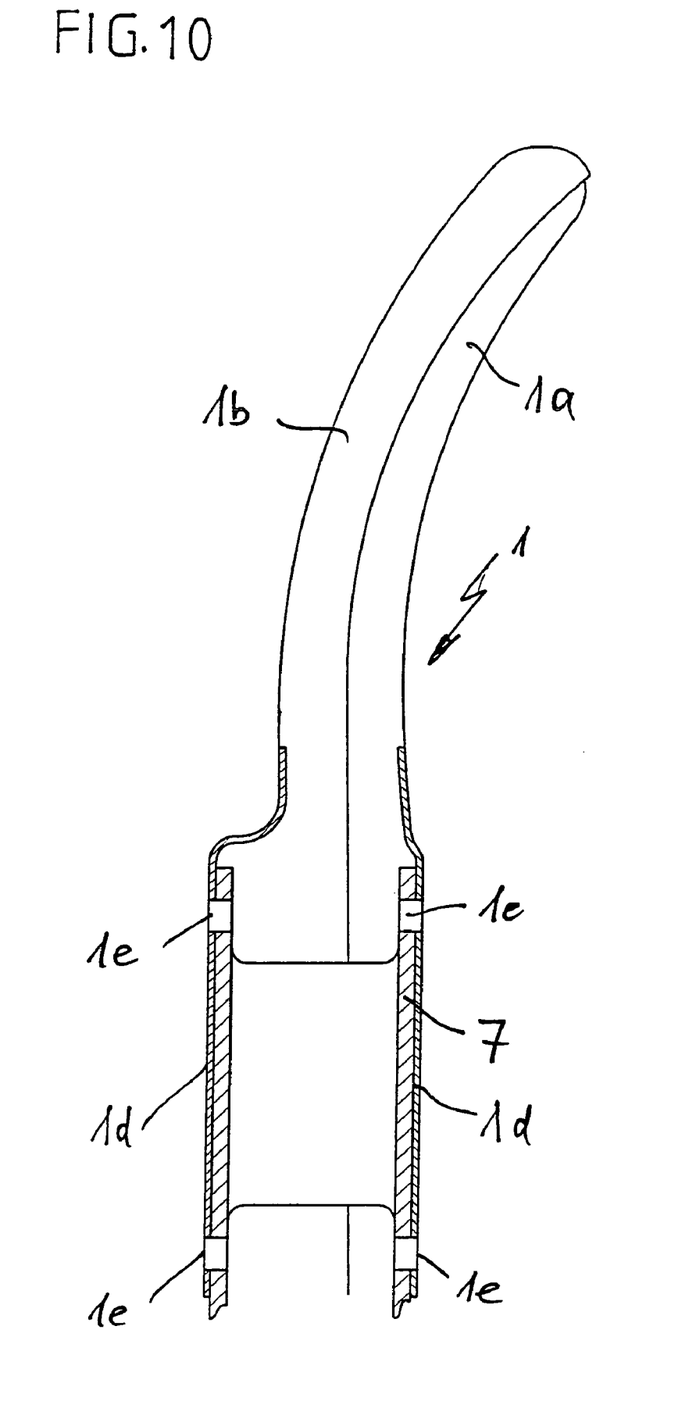
Figure 11:
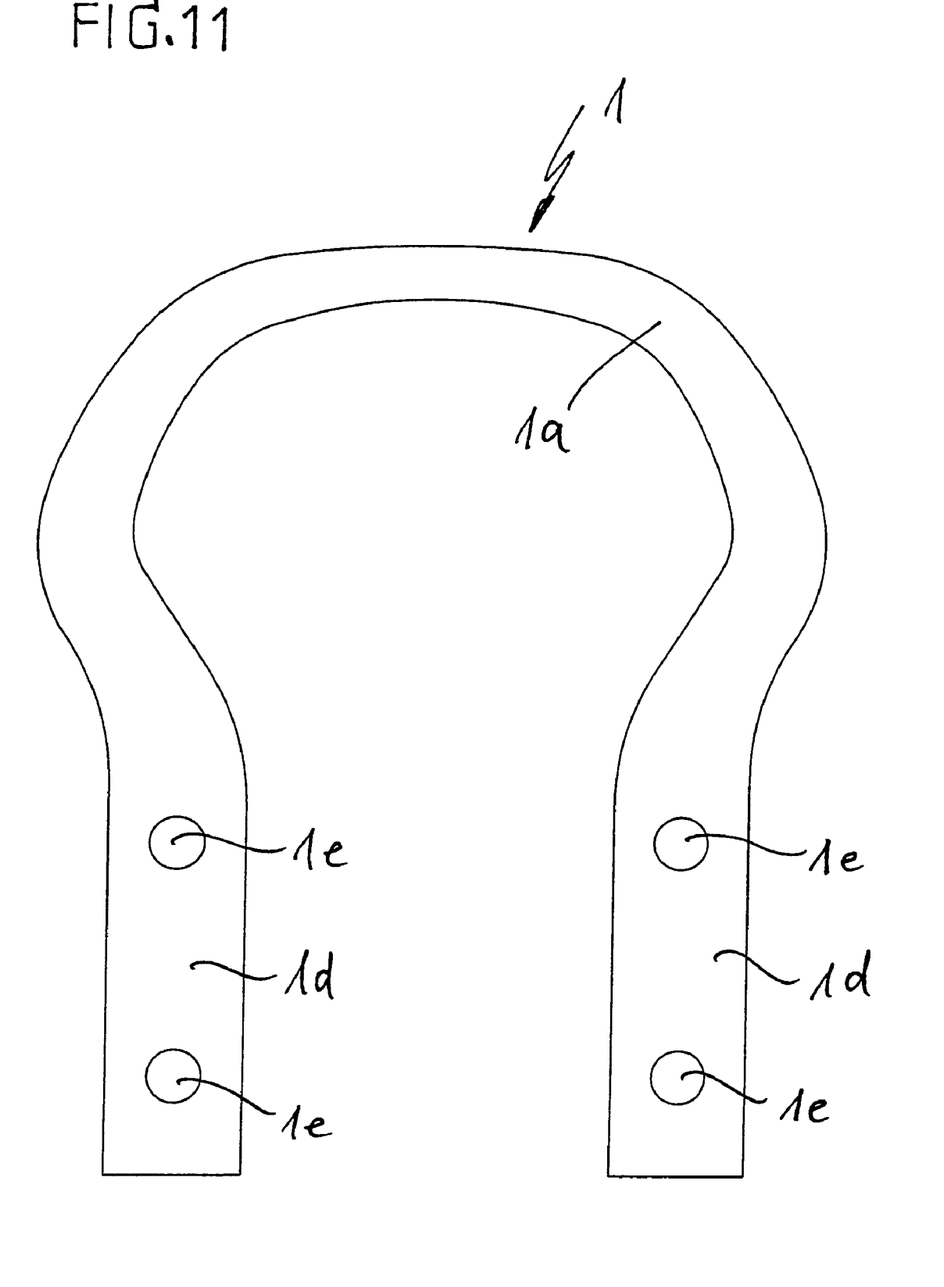

Instead of a firm, i.e., rigid installation of the roll bar, according to FIGS. 10 and 11, one can also have a design such that the roll bar is controlled by sensor to deploy and is held in a case firmly mounted on the body, wherein advisedly the shell-construction U-shaped top piece 1 is fastened to a deployable base body 7 with its fastening shells 1*d*, having fastening openings 1*e*. In one variant, the fastening shells 1*d* can also be connected to a base piece.

Therefore, the invention is not confined to firmly installed roll bars, nor to U-shaped roll bars as a whole.

What is claimed is:

1. A rollover protection system for motor vehicles comprising: a roll bar, having a top piece that is tubular and U-shaped, wherein at least the tubular top piece consists of at least two axially divided partial tubular shells of sheet metal, joined to each other and having different geometrical shapes corresponding to a nominal contour, wherein the roll bar is configured as a U-shaped roll bar with the top piece and two parallel legs for each shell, wherein not only the top piece, but also the legs consist of partly tubular shells of sheet metal, joined to each other, and wherein the top piece and the two parallel legs of each shell are formed as a single piece, wherein the shells of the top piece are padded with a plastic jacket, wherein the shell adapted to face one or more passengers of the vehicle is configured partially or predominantly flat, and the plastic jacket in this region is thicker than on the other shell.

2. The roll-over protection system according to claim 1, wherein for attachment of the roll bar to a vehicle body, a base piece is provided connected to the roll bar, wherein the base piece consists of molded half shells connected with each other.

3. The roll-over protection system according to claim 2, wherein the shells of the roll bar and said base piece consist of integrally molded sheet parts.

4. The roll-over protection system according to claim 2, wherein there is provided a separate base piece into which the legs of said roll bar are inserted and secured.

5. The roll-over protection system according to claim 4, wherein an elastically deformable absorber element is disposed between said shells of the base piece and said legs of the roll bar.

6. The roll-over protection system according to claim 4, wherein supporting rubber and metal spacer elements are disposed between said sheet shells of the base piece.

7. The roll-over protection system according to claim 6, wherein said supporting rubber and metal spacer elements are provided with mounting holes.

* * * * *